United States Patent [19]

Swedo et al.

[11] Patent Number: 4,758,251
[45] Date of Patent: Jul. 19, 1988

[54] SEPARATION OF GASES THROUGH GAS ENRICHMENT MEMBRANE COMPOSITES

[75] Inventors: Raymond J. Swedo, Mt. Prospect; Paul R. Kurek, Schaumburg, both of Ill.

[73] Assignee: Allied-Signal Inc., Morristown, N.J.

[21] Appl. No.: 78,442

[22] Filed: Jul. 27, 1987

Related U.S. Application Data

[63] Continuation-in-part of Ser. No. 57,693, May 26, 1987, abandoned, which is a continuation of Ser. No. 813,798, Dec. 27, 1985, abandoned.

[51] Int. Cl.$^4$ .............................................. B01D 53/22
[52] U.S. Cl. ............................................ 55/16; 55/68; 55/158
[58] Field of Search .......................... 55/16, 158, 68; 210/490, 506

[56] References Cited

U.S. PATENT DOCUMENTS

| 2,966,235 | 12/1960 | Kammermeyer | 55/16 |
|---|---|---|---|
| 3,335,545 | 8/1967 | Robb et al. | 55/16 |
| 3,526,588 | 9/1970 | Michaels et al. | 55/158 X |
| 3,556,305 | 1/1971 | Shorr | 210/490 |
| 3,767,737 | 10/1973 | Lundstrom | 55/158 X |
| 3,892,665 | 7/1975 | Steigelmann et al. | 210/490 |
| 3,951,621 | 4/1976 | Hughes et al. | 55/16 |
| 3,980,456 | 9/1976 | Browall | 55/158 |
| 4,132,824 | 1/1979 | Kimura et al. | 55/158 X |
| 4,155,793 | 5/1979 | Salemme et al. | 264/298 X |
| 4,157,960 | 6/1979 | Chang et al. | 55/158 X |
| 4,192,824 | 3/1980 | Robinson et al. | 585/409 |
| 4,214,020 | 7/1980 | Ward et al. | 55/16 |
| 4,230,463 | 10/1980 | Henis et al. | 55/16 |
| 4,243,701 | 1/1981 | Riley et al. | 55/158 X |
| 4,248,913 | 2/1981 | Jakabhazy et al. | 427/244 |
| 4,262,041 | 4/1981 | Eguchi et al. | 210/506 X |
| 4,302,334 | 11/1981 | Jakabhazy et al. | 427/244 X |
| 4,393,113 | 7/1983 | Sugie et al. | 55/16 X |
| 4,406,673 | 9/1983 | Yamada et al. | 55/16 |
| 4,439,217 | 3/1984 | Yamabe et al. | 55/158 |
| 4,444,662 | 4/1984 | Conover | 55/16 X |
| 4,484,935 | 11/1984 | Zampini | 55/158 |

FOREIGN PATENT DOCUMENTS

| 31725 | 7/1981 | European Pat. Off. | |
| 62302 | 4/1984 | Japan | 55/158 |
| 154104 | 9/1984 | Japan | 55/158 |

Primary Examiner—Robert Spitzer
Attorney, Agent, or Firm—Thomas K. McBride; Eugene I. Snyder

[57] ABSTRACT

Thin film composite membranes having as a permselective layer a film of a homopolymer of certain vinyl alkyl ethers are useful in the separation of various gases. Such homopolymers have a molecular weight of greater than 30,000 and the alkyl group of the vinyl alkyl monomer has from 4 to 20 carbon atoms with branching within the alkyl moiety at least at the carbon atom bonded to the ether oxygen or at the next adjacent carbon atom. These membranes show excellent hydrolytic stability, especially in the presence of acidic or basic gaseous components.

19 Claims, No Drawings

SEPARATION OF GASES THROUGH GAS ENRICHMENT MEMBRANE COMPOSITES

The Government of the United States has rights in this invention pursuant to Contract No. DEAC-1-79CS-40294 awarded by the U.S. Department of Energy.

CROSS REFERENCE TO RELATED APPLICATIONS

This applicataion is a continuation-in-part of our co-pending application Ser. No. 057,693 filed May 26, 1987, which was a continuation of Ser. No. 813,798, filed Dec. 27, 1985, both now abandoned.

BACKGROUND OF THE INVENTION

The use of semipermeable membranes for reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the water may then be utilized for personal use such as drinking, cooking, etc.

More recently certain membranes have been utilized for the separation of various gases. The separation of a gas mixture utilizing a membrane is effected by passing a feed stream of the gas across the surface of the membrane. Inasmuch as the feed stream is at an elevated pressure relative to the effluent stream, the more permeable component of the mixture will pass through the membrane more rapidly than the less permeable component(s), affording a permeate stream (that passing through the membrane) enriched in the more permeable component and a residue stream enriched in the less permeable component(s) of the feed stream.

This ability to separate gases from a mixture stream finds many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation include helium recovery from natural gas, hydrogen enrichment in industrial process applications, and scrubbing of acid gases. Specific uses for oxygen enrichment of air are breathing systems for submarines and other underwater stations, improved heart-lung machines, and other lung assist devices. Another specific application of a gas separation system is an aircraft to provide oxygen enrichment for life-support systems and nitrogen enrichment for providing an inert atmosphere for fuel systems. In addition, oxygen enriched air can be used in furnaces for more efficient combustion and in catalytic oxidation of organic compounds, e.g., mercaptans, hydrocarbons, alcohols, aldehydes, etc., to name but a few. Likewise, gas separation systems may be used for environmental benefits, e.g., methane can be separated from carbon dioxide in waste gases for sewage treatment processes and oxygen enriched air can be produced to enhance sewage digestion.

The separation of gases by a selective separation process will provide a product which possesses a different proportion of the gases than was present in the original feed mixture. The membranes which may be utilized to effect such a selective separation must possess the ability to withstand the conditions to which they are subjected during the separation operation and must provide a sufficiently high flux so as to permit the use of these membranes in a commercially attractive process. Therefore, it is necessary to provide membrane composites which exhibit a highly selective separation with regard to various gases as well as providing an economically attractive flux.

Membranes which are composites of a thin polymer film on a porous support have been reported. For example, U.S. Pat. No. 3,892,665 discloses a thin polymer film which is formed on the surface of a liquid, generally water, and is subsequently transferred to the surface of a porous supporting membrane. During the transfer of the thin polymer film, the porous support is maintained in a wetted stage with the liquid. Alternatively, the thin film can be formed on the surface of the porous membrane if the surface of the support is first wet with the transfer liquid. In either case the pores of the support member must be filled with liquid and, therefore, the liquid must be removed from the porous support at a period subsequent to the formation of the film in order to draw the film onto the support. In general, such a polymer film is a monomolecular layer which is formed on the surface of the water wherein the individual film-forming monomer and/or polymer chains are oriented and closely packed. Subsequently, the oriented monomolecular layer or film, which is limited to a thickness in the range of from about 5 to about 25 Angstroms, is transferred to the surface of the porous support membrane. This process may be repeated until multiple monolayers are deposited on the surface of the support, the total film thickness then being from about 10 to about 200 Angstroms. Other than van der Waals' forces, there is no bonding between the aggregate layers and the support, which means that the thin film of the finished membrane is weakly attached to the porous support and said membrane cannot withstand substantial back pressure when in operation. Obviously, this process is tedious and expensive and is not readily amenable to commercial use.

U.S. Pat. No. 3,526,588 discloses a macromolecular fractionation process and describes a porous ultrafiltration membrane which is selective on the basis of pore size. In contradistinction to this, it is essential that a thin film membrane for gas separation be nonporous, so that separation operates by a diffusion-solution mechanism of transport. U.S. Pat. No. 3,767,737 which discloses a method for producing castings of "ultra-thin" polymer membranes is similar in nature to U.S. Pat. No. 3,892,665 in that the thin film of the membrane is formed on the surface of a liquid and transferred to the surface of a porous support membrane. The thin film polymer will thus inherently possess a disadvantage ascribed to the membrane of the former patent in that it cannot withstand substantial back pressure when in operation. In addition, U.S. Pat. No. 2,966,235 discloses a separation of gases by diffusion through silicone rubber which is not composited on a porous support material.

U.S. Pat. No. 4,155,793 involves a continuous method for the preparation of membranes by applying a polymer to a microporous support. However, the method of production described in this patent involves the spreading of a polymer casting solution onto the surface of a liquid substrate. The polymer which is utilized is not soluble in the liquid substrate nor is the solvent which is used compatible with the microporous support. The polymer film which constitutes the membrane is formed on the surface of the liquid and is thereafter applied to the microporous support. U.S. Pat. No. 4,132,824 discloses an ultra-thin film of a polymer composite which comprises a blend of a methylpentene polymer and an organopolysiloxane-polycarbonate interpolymer for a thickness less than about 400 Angstroms in which the interpolymer is present in an amount of up to about 100 parts by weight per 100 parts by weight of the methylpentene polymer. Likewise, U.S. Pat. No. 4,192,824 describes a method for preparing the aforementioned interpolymer by depositing on the surface of a liquid casting substrate a casting solution which comprises a mixture of methylpentene polymer and from 0 to 100 parts by weight of an organopolysiloxane-polycarbonate copolymer. The casting solution spreads over the surface of the liquid casting substrate to form a thin film following which at least a portion of the thin film is removed from the surface of the substrate. Thereafter, the film may be used in contact with a porous support as a gas separation membrane.

Other patents have also described various membranes for effecting a gas separation. In this respect, U.S. Pat. No. 4,230,463 describes a multicomponent membrane in which a material which exhibits selective permeation of at least one gas from a gaseous mixture is in occluding contact with a porous separation membrane. Various types of polymers are cited as being suitable for the porous separation membrane, the preferred polymer being a polysulfone. It is also stated in this patent that the porous separation membrane is preferably at least partially self-supporting and in some instances may be essentially self-supporting. European Patent Application No. 0031725 is drawn to an ultrathin solid membrane process which may be used for gas separation. This membrane is prepared by dissolving an additional polymer derived from at least one monomer selected from ethylenically unsaturated hydrocarbon monomers and conjugated unsaturated hydrocarbon monomers in an organic liquid medium which may, if so desired, contain another organic compound such as an alcohol, ketone, aldehyde, carboxylic acid, etc. The solvent solution is then spread on a liquid support such as water and the desired membrane is formed on the surface thereof.

U.S. Pat. No. 3,335,545 is drawn to a process for gas separation by differential permeation, said process being effected through liquid or quasi-liquid films which behave substantially as polymeric films. Another U.S. Pat. No. 3,951,621, is drawn to a process for separating one or more components of a gaseous mixture utilizing a membrane of cross-linked hydrophilic poly(vinyl alcohol) and a polyamide such as nylon. In addition, the film contains complex-forming metal components which are active in the presence of water. The films are used as a free-standing self-supporting membrane. U.S. Pat. No. 4,248,913 discloses a process for preparing a membrane which comprises a blend of a vinylidene fluoride polymer and a hydrolyzed vinyl acetate polymer which forms a self-supporting film used in ultrafiltration processes. U.S. Pat. No. 4,302,334 also discloses a microporous polymeric membrane based upon the membranes set forth in U.S. Pat. No. 4,248,913. In addition, the membranes may also include copolymers of vinyl acetate with other components such as acrylates, maleates and ethylene.

The membranes described in U.S. Pat. Nos. 3,556,305 and 4,439,217 are superficially, but only superficially, analogous to the membrane of our invention. The former relates to membranes used in ultrafiltration and reverse osmosis where the membrane is a composite of a porous substrate, an adhesive, and a diffusive polymer or gellike film. Among the diffusive polymers was mentioned a mixture of poly(vinyl methyl ether) with a copolymer of vinyl methyl ether and maleic anhydride. U.S. Pat. No. 4,439,217 teaches a permselective layer for gas separation composed of an organic polymer having pivalate groups in the side chains. The pivalate group is taught as being the permselective element, and the patentee teaches that pendant pivalate groups can be incorporated via homopolymerization of vinyl pivalate or copolymerization of the latter with other monomers including vinyl ethers generally and vinyl isobutyl ether specifically. But the patentee stresses that such comonomers are used solely to impart useful physical properties wholly unrelated to permselectivity. Consequently it is fair and accurate to state that the prior art is devoid of any teaching that homopolymers of vinyl alkyl ethers, and especially those of our invention, are useful as permselective elements in membranes for gas separation.

As previously mentioned, the separation of various gases from a mixture thereof may become increasingly important in view of the necessity to conserve energy. A particular application would relate to increasing the thermal efficiency of combustion processes when utilizing fossil fuels in commercial combustion applications. Also, by utilizing a gas separation membrane in coal gasification, it may be possible to provide an oxygen enrichment of air for the production of low and medium British Thermal Unit (BTU) product gases as well as an oxygen enrichment of air for the combustion of these gases. For example, by placing a gas membrane separation system in close proximity to both gas production and gas combustion facilities, it would allow a site-located oxygen enrichment plant to supply both processes without the additional expense of transporting the gas or duplicating enrichment facilities.

The requirements for an efficient oxygen enrichment membrane, for example, include the characteristics of being thermally stable at moderately elevated temperature; the ability to withstand high pressures without physically destroying the membrane; hydrolytic stability to water and/or water vapor; and existence in a physical form which is adaptable for use as a thin film composite membrane in sheet form or as a coating to hollow fine fibers. As will be shown in greater detail, we have now discovered a gas enrichment membrane composite which will possess all of the desirable characteristics enumerated. In particular, we have found that a membrane of a porous backing support having a permselective layer of a homopolymer of certain vinyl alkyl ethers is a quite convenient composite for various gas separations. In particular, homopolymers of such ethers where the alkyl group is branched either at the carbon bonded to the ether oxygen or at the next adjacent carbon atom form an especially useful permselective layer.

SUMMARY OF THE INVENTION

This invention relates to a process for the separation of gases. More specifically, the invention is concerned with a process for the separation of gases by passage of a gas mixture over a membrane of a particular composition whereby a permeate stream enriched in at least one component is obtained. In addition, the invention is also concerned with novel gas enrichment membrane compositions.

It is therefore an object of this invention to provide a process for the separation of gases whereby a preferred gas enrichment stream may be obtained.

A further object of this invention is to effect a separation of gases whereby a stream of gas which is enriched in a preferred gas is obtained, said process utilizing novel gas enrichment membrane composites.

In one aspect an embodiment of this invention resides in a process for the separation of a preferred gas from a gaseous feed mixture containing at least two dissimilar gases which comprises passing a stream of said mixture over the surface of a membrane which is a composite comprising a porous support backing material having a thin film of one or more homopolymers of certain vinyl alkyl ethers composited on the surface of said support at separation conditions, and recovering a permeate in which the proportion of said preferred gas to other gases is greater than the proportion of said preferred gas to other gases in said gaseous feed mixture.

Another embodiment of this invention is a gas enrichment membrane which comprises a porous support backing material having composited on the surface thereof a thin film of one or more homopolymers of specific vinyl alkyl ethers.

A specific embodiment of this invention is a process for the separation of oxygen from a gaseous feed mixture containing oxygen and nitrogen which comprises passing said mixture over the surface of a membrane of a polysulfone having a thin film of poly(vinyl isobutyl ether) on the surface of said polysulfone at a temperature in the range of from about ambient to about 70° C. and a pressure in the range of from about 20 to about 100 pounds per square inch and recovering a permeate stream enriched in oxygen.

Another specific embodiment of this invention is a gas enrichment membrane which comprises polysulfone having composited on the surface thereof a thin film of poly(vinyl isobutyl ether).

Other objects and embodiments will be cited in the following detailed description of the invention.

DETAILED DESCRIPTION OF THE INVENTION

The present invention is concerned with a process for the separation of gases utilizing as separation means a gas enrichment membrane composite. The gas membrane composite which is utilized to effect the desired separation comprises as the active or permselective layer a thin film of a homopolymer of particular vinyl alkyl ethers composited on the surface of a porous support backing material. More specifically, the alkyl moieties of the vinyl alkyl ether monomer contain four to twenty carbon atoms and are branched at least at the carbon bonded to the ether oxygen or at the next adjacent carbon. The membranes of our invention are quite desirable in part because the homopolymers which are the active, permselective layer are readily available or can be easily prepared. The homopolymers are readily soluble in organic solvents at ambient temperature leading to ease and simplicity of composite fabrication. The composites also show good selectivity in some gas separations and exhibit a reasonable flux for their selectivity.

In addition, our polymers show much better chemical stability than poly(vinyl esters) and poly(vinyl ketals), especially in their resistance to hydrolysis, and more particularly in their hydrolytic stability in the presence of an acid or base.

The separation of the gases is accomplished by a selective permeation process where different gases present in a gaseous feed stream mixture will pass through a properly selected membrane at different rates due to the different permeability factors exhibited by the individual gases present in the mixture. That part of the membrane which effects this gas separation process is called the permselective layer and in this invention are homopolymers of certain vinyl alkyl ethers, the polymers forming a thin film which is composited on the surface of a porous support backing material.

The porous support backing material has pores providing relatively little resistance to gas flow. It is contemplated within the scope of this invention that the porous support backing material may be either synthetic or naturally occurring. Examples of porous support backing materials which may be employed include polymers such as polysulfone, sulfonated polysulfone, blends of polysulfone and sulfonated poly(ether sulfone), polycarbonate, microporous polypropylene, polyamides, polyphenylene oxide, polyesters, natural fabrics such as canvas, cotton, linen, etc., synthetic fabrics such as polyesters, either woven or nonwoven, Dacron, Nylon, Orlon, etc. Among these polysulfone and sulfonated polysulfone polymers are preferred porous supports. Blends of polysulfone and from 0.1 to 5 weight percent sulfonated poly(ether sulfone) also are quite useful, especially blends containing 0.5-2 weight percent of the latter.

Inasmuch as the composite membrane of the present invention will comprise a thin film composited on a backing support, the latter being used to add mechanical strength to the finished membrane composition, it is possible to utilize the thin film wherein the thickness of the film can vary from about 100 to about 10,000 Angstroms, and more commonly from about 1,000 to about 5,000 Angstroms. By utiliizing the film which possesses the aforesaid thickness, it is possible to obtain a relatively high flux of the gas which permeates through the membrane.

The thin film which is composited on the porous support backing material is a homopolymer of a vinyl alkyl ether. It is desirable to avoid crystalline polymers, or polymers with significant crystalline regions, because such polymers are brittle, therefore mechanically undesirable, and often exhibit lower flux than films from noncrystalline polymers. We have found that chain branching in the alkyl moiety reduces crystallinity, and the vinyl alkyl ethers of our invention preferably have chain branching in the alkyl moiety at least at the carbon adjacent to the ether oxygen (the alpha-carbon) or at the next adjacent carbon (the beta-carbon). The alkyl moiety can have from four up to about 20 carbon atoms, although the lower alkyl moieties containing four through about eight carbons are preferred, and the isobutyl moiety is especially preferred.

According to the foregoing the vinyl alkyl ethers used as monomers in this invention have the formula,

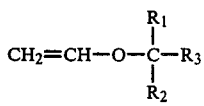

where $R_1$, $R_2$, and $R_3$ are independently selected from the group consisting of hydrogen or alkyl moieties subject to the constraints that the sum of carbon atoms in $R_1$, $R_2$, and $R_3$ is from 3 to about 19, and at least one of $R_1$ and $R_2$ is not hydrogen; or

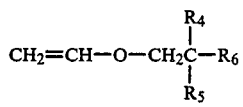

where $R_4$, $R_5$ and $R_6$ are independently selected from the group consisting of hydrogen or alkyl moieties subject to the constraints that the sum of carbon atoms in $R_4$, $R_5$, and $R_6$ is from 2 to about 18, and at least one of $R_4$ and $R_6$ is not hydrogen. Examples illustrative of monomers from which the homopolymers result include vinyl isobutyl ether, vinyl secbutyl ether, vinyl tert-butyl ether, vinyl 1,1-dimethylpropyl ether, vinyl 1-methylbutyl ether, vinyl 1, 2-dimethylpropyl ether, vinyl 2, 2-dimethylpropyl ether, vinyl 2-methylbutyl ether, and the branched chain analogues of vinyl hexyl ethers, vinyl heptyl ethers, vinyl octyl ethers, vinyl nonyl ethers, vinyl decyl ethers, and so forth. It is to be understood that the aforementioned list of ethers are only representative of the class of monomers which may be employed to form the thin film of the composites, and that the present invention is not necessarily limited thereto.

For good film forming properties the homopolymer should have a minimum molecular weight of about 30,000. However, a molecular weight from about 200,000 up to about 1,000,000 is preferred in the practice of our invention.

The thin film membrane composites may be prepared in either a continuous or hand-casting operation. For example, when a hand-casting operation is employed, a casting solution is prepared by dissolving the solid polymer in an appropriate solvent which may include: a halogenated solvent such as trichlorotrifluoroethane; a paraffinic hydrocarbon solvent such as pentane, hexane, and heptane; or a cycloparaffinic solvent such as cyclopentane, cyclohexane, cycloheptane. In all cases temperatures may range from ambient (20°-25° C.) up to the reflux temperature of the particular solvent which is employed. Upon reaching a complete solution, if elevated temperatures are used, the solution is cooled to room temperature and filtered to render the solution free of any residual solid material which may be present. The amount of polymer which may be present in the solvent solution will vary in accordance with the desired thickness of the film which is to be obtained. In the preferred embodiment of the invention, the polymer will be present in the solution in an amount in the range of from about 0.1 to about 5% by weight of the solution. The solution is then cast upon the surface of the desired porous support backing material and excess solution is removed. The resultant coated support is then cured by being subjected to an elevated temperature which may range from about 25° to about 150° C. for a period of time which may range from about 1 minute to about 24 hours.

When the desired membrane is prepared in a continuous manner, the casting solution which has been prepared in a manner similar to that described above is placed in a trough which is provided with a roller. The porous support backing material is continuously passed under the roller in such a manner that the surface of the support is contacted with the polymer casting solution. The rate of passage of the porous support material through the casting solution is sufficient to impart a coating on the surface of the support which will possess a predetermined thickness after evaporation of the solvent. Again, in the preferred embodiment of the invention, the rate of passage of the porous support backing material through the casting solution will be at a rate of about 0.1 to about 20 ft/min. After passage through the casting solution, the porous support material which contains the thin film membrane composited on the surface thereof will be treated so as to remove any excess solution and after the solvent has been evaporated, the membrane is cured in a manner similar to that hereinbefore set forth.

The film of homopolymer in the composite generally will be as thin as possible to maximize flux, and usually is in the range from 100 to 10,000 Angstroms, even more commonly between about 1,000 and 5,000 Angstroms. Film thickness may be varied by varying the concentration of the polymer in the casting solution, by varying the speed at which the casting solution is applied, or by varying the gap between the support surface and the application knife edge.

The process for separating gases from mixtures thereof utilizing the gas enrichment membrane compound of the present invention may be effected in any suitable manner which is known in the art. By utilizing these membranes, it is possible to obtain a separation of gases involving selectivities which may be greater than 2.7 at a flux which may be in the range of from about 0.1 to about 10 cc/min-psi. The process is effected by contacting one surface of a membrane of the type set forth in the present specification with a gaseous mixture, said membrane exhibiting a selective permeation of one gas in the mixture over that of the remaining gas or gases present in the gaseous feed mixture.

The apparatus which may be employed to effect the desired separation may be any separation device which is known in the art. For example, the separation device may be used in either single stage or multistage membrane plants. One type of configuration in which the gas membrane may be used may comprise a spiral wound element. In this type of element, two sheets of the membrane of the present invention are separated by the porous support backing material, the latter both affording a support for the thin film composite membrane against the operating pressure as well as providing a flow path for the gaseous output. The thin film composite membranes are sealed around three edges or sides in order to prevent contamination of the product gas while the fourth edge or side is sealed to a product tube. The product tube is provided with perforations inside of the edge seal area in order that the product gases can be removed from the porous support material. The resulting configuration is in the form of an envelope which is rolled up about the center tube in the form of a spiral along with a mesh spacer which separates the facing surface membrane. More than one such envelope may be sealed to the product tube if desired. By utilizing such a type of element, it is possible to take advantage of a number of factors which include, among others, a large membrane surface area per unit volume, a convenient and simple pressure design and configuration, which, in turn, will lead to a compact module plant arrangement, flexibility and ease in installation and in replacement of the elements inasmuch as the modules may comprise two or more disposable units connected in series.

It is contemplated within the scope of this invention that the membranes may be used for the separation of various gases from each other, although not necessarily with equivalent results. For example, the separation of carbon dioxide from methane and natural gas to remove non-combustible material is a potentially important application, as are the separation of hydrogen sulfide from industrial gas streams and sulfur dioxide from flue gas. Because of their hydrolytic stability in the presence of an acidic or basic gaseous component, our membranes may be especially advantageous in the foregoing separations, as well as in the separation of ammonia from hydrogen or nitrogen. Our membranes also are useful in the separation of oxygen and nitrogen, and other examples of mixtures of gases which may be subjected to the separation process of the present invention include $CH_4/H_2$, $CO_2/H_2$, $H_2O/NH_3$, $CO_2/CO$, $NO_2/NO$, $CS_2/N_2O$, $H_2S/CO$, $SO_2/CO$, $SO_2/N_2$, etc. The reaction conditions which may be employed for effecting the separation of the gases will include temperatures in the range of from about 20° to about 70° C. and a pressure which may range from about 20 to about 100 pounds per square inch (psi).

The following examples are given for purposes of illustrating the various aspects of the present invention including the synthesis of the thin film composite membrane, the casting of the thin film composite membrane on a porous support backing material and a process for utilizing the membrane composite in the separation of gases. However, it is to be understood that these examples are given merely for the purpose of illustration and that the present process is not necessarily limited thereto.

EXAMPLE I

To prepare the membrane composition of the present invention, casting solutions were prepared by stirring various weight percentages of the poly(vinyl isobutyl ether) with either hexane or cyclohexane which acted as the solvent for the homopolymer at room temperature or at temperatures up to the reflux temperature of the solvent until a complete solution of the polymer in the solvent was obtained. The polymer was present in the solutions in weight percentages ranging from 1.0 to 5.0. After complete solutions of the polymer were obtained, the solutions were allowed to cool to room temperature and were filtered free of any residual solid material in order to obtain a pure polymer solution.

The membrane was then prepared by placing the polymer casting solution in a 6 inch long by 1½ inch wide by 1 inch deep cating trough which was provided with a roller fitted along the length thereof. The amount of casting solution which was employed in the trough was sufficient enough so that the surface of the solution wetted the surface of the roller.

A strip of microporous polysulfone support having a width of about 5 inches was passed under the roller in the trough in such a manner so that one surface of the polysulfone support contacted the polymer casting solution. In a continuous casting process the polysulfone support was passed through the solution at casting speeds which ranged from 2.0 to 4.0 ft/min allowing a contact time which ranged from 2.0 to about 15.0 seconds. The resulting membrane composition comprising a thin film homopolymer composited on the surface of the porous support backing material was then placed in a vertical position and maintained thereat until all the solvent had evaporated. Following this, the membrane was then cured at a temperature of about 50° C. for a period of about 30 minutes.

EXAMPLE II

To evaluate the membranes as gas separation or gas enrichment membrane composites, circular 3½ inch diameter samples of the membranes were cut out with a die. The membranes were loaded into stainless steel test cells and a gaseous feed mixture having a composition of aapproximately 21% oxygen and 79% nitrogen (pure air) was charged to the cell. The cells were provided with a gas inlet for the feed gas and an outlet port for the gas permeate. The flow was set at a pressure of 20 psi while maintaining a temperature of 25° C. The results of these tests are set forth in the table below.

TABLE

Selectivity and Flux Data for Poly(vinyl isobutyl ether) Membranes on Polysulfone Supports.

| Casting Soluiion Wt. % Polymer Solvent | Casting speed ft/min. | Average $O_2/N_2$ Selectivity | Average $Q_{O_2}$ (cc/min-psi) |
|---|---|---|---|
| 2.0 Cyclohexane | 2.0 | 3.18 | 0.195 |
| 2.0 Cyclohexane | 3.0 | 3.38 | 0.180 |
| 2.0 Cyclohexane | 4.0 | 3.20 | 0.158 |
| 3.0 Cyclohexane | 2.0. | 3.78 | 0.123 |
| 3.0 Cyclohexane | 3.0 | 3.69 | 0.115 |
| 3.0 Cyclohexane | 4.0 | 3.66 | 0.110 |
| 4.0 Cyclohexane | 2.0 | 2.26 | 0.8074 |
| 4.0 Cyclohexane | 3.0 | 3.84 | 0.0529 |

EXAMPLE III

In this example the desired membranes were obtained utilizing a hand casting procedure in place of the continuous type of casting which was employed in the previous examples. The membranes were prepared by casting a solution of poly(vinyl isobutyl ether) dissolved in cyclohexane onto the surface of a polysulfone support, removing excess solution and allowing the solvent to evaporate. The dry membranes were then cured at a temperature of about 50° C. for a period of 30 minutes. As in the previous examples, samples of the membranes were cut and utilized in a test cell while employing air as the feed mixture. The results of these tests are set forth in the table below. The contrasting results obtained for the two 3 weight percent samples demonstrate that the polysulfone must be of high quality and free of surface defects in order to achieve the highest membrane performance.

TABLE

| CASTING SOLUTION CONCENTRATIONS (wt. %) | SOLVENT | AVERAGE $O_2/N_2$ SELECTIVITY | AVERAGE $Q_{O_2}$ (cc/min-psi) |
|---|---|---|---|
| 1.0 | Cyclohexane | 0.98 | 13.6 |
| 2.0 | " | 2.82 | 0.25 |
| 3.0 | " | 4.10 | 0.10 |
| 3.0 | " | 1.28 | 0.78 |

EXAMPLE IV

A similar set of membranes were prepared in a manner identical to that set forth in Example 1 above. In this preparation the support which was utilized comprised a standard polysulfone, a water damp support of polymers containing a sulfonated poly(ether sulfone) and a dry support of polysulfone containing 1.0 wt. % of the sulfonated poly(ether sulfone). The membranes which were recovered were then tested in a manner similar to that set forth in Example II above. The results which were obtained when utilizing the various types of supports are set forth in the following table:

TABLE

Selectivity and Flux Data for Poly(vinyl isobutyl ether) Membranes on various Supports

| SUPPORT | CASTING CONC. (wt. %)[a] | CASTING SPEED (FT/MIN) | # OF SAMPLES TESTED | AVERAGE $Q_{O_2}$ (cc/min-psi) | AVERAGE $O_2/N_2$ SELECTIVITY |
|---|---|---|---|---|---|
| 1 | 3.0 | 3.0 | 8 | 0.119 | 3.55 |
| 1 | 2.5 | 3.0 | 8 | 0.242 | 2.55 |
| 2 | 2.5 | 3.0 | 8 | 0.246 | 3.60 |
| 3 | 2.5 | 3.0 | 11 | 0.124 | 4.95 |

1. Standard polysulfone support.
2. Water-damp support of polysulfone containing 1 wt. % sulfonated poly(ether sulfone).
3. Dry support of polysulfone containing 1% sulfonated poly(ether sulfone)
[a] All membranes cast from cyclohexane solutions.

EXAMPLE V

In this example, membranes were prepared in a manner identical to that set forth in Example IV above. In this preparation, the casting solution consisted of 2.5 weight percent of poly(vinyl isobutyl ether) dissolved in cyclohexane. The casting solution was applied continuously to the surface of a dry support of polysulfone containing 1.0 weight percent of the sulfonated poly(ether sulfone) at a casting speed of 3.0 ft./min.

The membranes which were recovered were fabricated into three, single-leaf, 2"×10" spiral-wound test elements. The three elements were tested using air as the feed mixture. The flow through the element was set to maintain a pressure of 20 psi while maintaining a temperature of 25° C. Analysis of the permeate gas through the elements gave the following performance results.

TABLE

Selectivity and Flux Data for Test Elements of Poly(vinyl isobutyl ether) Membranes.

| Element # | $Q_{O_2}$ (cc/min psi) | $\alpha$ ($O_2/N_2$) |
|---|---|---|
| 1 | 0.12 | 4.51 |
| 2 | 0.13 | 6.05 |
| 3 | 0.13 | 6.05 |

EXAMPLE VI

Other membranes also may be prepared utilizing a process similar to that set forth in the previous examples in which a solution containing from about 1 to about 5% by weight of poly(vinyl sec-butyl ether), poly(vinyl tert-butyl ether), poly(vinyl 2, 2-dimethyl-propyl ether) or poly(vinyl 2-ethylhexyl ether), cast in either a continuous manner or by hand on porous support backing material which may comprise a polysulfone or a blend of polysulfone and sulfonated poly(ether sulfone). After allowing the solvent to evaporate, the thin film composite of the poly(vinyl ether) on the surface of the support may be cured and utilized as a gas separation membrane to obtain a gaseous product mixture which contains a greater proportion of a preferred gas such as oxygen than was present in the original gaseous feed mixture.

What is claimed is:

1. A process for the separation of a gas from a gaseous mixture containing said gas comprising passing a stream of the mixture over the surface of a membrane at separation conditions, where the membrane is a thin film composite comprising a porous support backing material having a thin film of a homopolymer of a vinyl alkyl ether composited on the surface of the support and where the alkyl moiety is a branched chain containing from 4 to about 20 carbon atoms with branching at least on the carbon bonded to the ether oxygen or the carbon adjacent thereto, and recovering at least the permeate enriched in said gas.

2. The process of claim 1 in which the separation conditions include a temperature in the range from about ambient to about 70° C. and a pressure from about 20 to about 100 pounds per square inch.

3. The process of claim 1 where the porous support backing material is selected from the group consisting of polysulfones, sulfonated polysulfones, blends of polysulfone and sulfonated poly(ether sulfone), polycarbonates, microporous polypropylene, polyamides, polyphenylene oxide, polyesters, canvas, cotton, and linen, or combinations thereof.

4. The process of claim 3 where the porous support backing material is a polysulfone.

5. The process of claim 3 where the porous support backing material is a sulfonated polysulfone or a blend of polysulfone and sulfonated poly(ether sulfone).

6. The process of claim 1 where the thin film is a homopolymer of a vinyl alkyl ether where the alkyl moiety contains 4 to 8 carbon atoms.

7. The process of claim 6 where the thin film is a homopolymer of vinyl isobutyl ether.

8. The process of claim 6 where the thin film is a homopolymer of vinyl sec-butyl ether.

9. The process of claim 1 where the gas mixture consists essentially of oxygen and nitrogen and the permeate is enriched in oxygen.

10. The process of claim 1 where the homopolymer has a molecular weight of at least 30,000.

11. The process of claim 10 where the homopolymer has a molecular weight from about 200,000 to about 1,000,000.

12. A membrane which is a thin film composite comprising a porous support backing material having a thin film of thickness from about 100 to about 10,000 Angstroms of a homopolymer of a vinyl alkyl ether composited thereon where the alkyl moiety is a branched chain containing from 4 to about 20 carbon atoms with branching at least at the carbon atom bonded to the ether oxygen or the carbon atom adjacent thereto, and the homopolymer has a molecular weight of at least 30,000.

13. The membrane of claim 12 where the porous support backing material is selected from the group consisting of polysulfones, sulfonated polysulfones, blends of polysulfone and sulfonated poly(ether sulfone), polycarbonates, microporous polypropylene, polyamides, polyphenylene oxide, polyesters, canvass, cotton, and linen, or combinations thereof.

14. The membrane of claim 13 where the porous support backing material is a polysulfone.

15. The membrane of claim 13 where the porous support backing material is a sulfonated polysulfone or a blend of polysulfone and sulfonated poly(ether sulfone).

16. The membrane of claim 12 where the thin films a homopolymer of a vinyl alkyl ether where the alkyl moiety contains from 4 to about 8 carbon atoms.

17. The membrane of claim 16 where the thin film is a homopolymer of vinyl isobutyl ether.

18. The membrane of claim 16 where the thin film is a homopolymer of vinyl sec-butyl ether.

19. The membrane of claim 12 where the homopolymer has a molecular weight of from 200,000 to about 1,000,000.

* * * * *